Dec. 6, 1938.    J. H. VAN UUM    2,139,567

MOLDING RETAINER CLIP

Filed Oct. 1, 1935    2 Sheets-Sheet 1

INVENTOR
John H. Van Uum,
BY
Justin W. Macklin,
ATTORNEY

Dec. 6, 1938.   J. H. VAN UUM   2,139,567

MOLDING RETAINER CLIP

Filed Oct. 1, 1935   2 Sheets-Sheet 2

INVENTOR
John H. Van Uum,
BY Justin W. Macklin
ATTORNEY

Patented Dec. 6, 1938

2,139,567

UNITED STATES PATENT OFFICE 2,139,567

MOLDING RETAINER CLIP

John H. Van Uum, Lakewood, Ohio

Application October 1, 1935, Serial No. 43,055

7 Claims. (Cl. 189—88)

This invention relates to devices for securing together a plurality of elements, particularly where one has in it a channel shaped opening provided with inturned flanges and the member to which it is secured is provided with spaced perforations.

A specific illustration of the utility of such a device is that of securing channel shaped bead trim now widely used in decoration and finishing of automobile bodies.

In the application of such trim and in the use of securing devices such as shown, described, and claimed in my prior application Serial No. 756,127, it has been found desirable to provide a device which shall effectively secure the bead trim member to the carrying member and which may be easily positioned in the trim prior to application.

If such devices tightly fit within the channel of the trim registration of the securing devices or spring clips with their respective openings is frequently difficult; wherefore it becomes desirable to provide a clip which may be placed into the slot-like opening at the inner side of the trim and which shall thereafter firmly grip or engage the interior. This allows placement of the securing clips in predetermined positions.

A further desirable characteristic is to so construct such a clip that while firmly maintaining its engagement with the trim it may yet be capable of longitudinal movement under application of sufficient pressure or pull.

The objects of this invention are to provide such a device meeting these requirements and which shall be simple, efficient, easy to manufacture, and which when in position shall very firmly hold the trim to the base or mounting member.

In carrying out the above objects it is a further objective to form such a securing grip with a minimum number of simple forming operations. The above and other objects will become more apparent in the following description which relates to the drawings illustrating a preferred embodiment showing different forms of the device for attaching bead trim. A modification of one of these forms may be used for holding panel floor mats or other articles to metal frame elements. In the drawings:—

Figure 1:
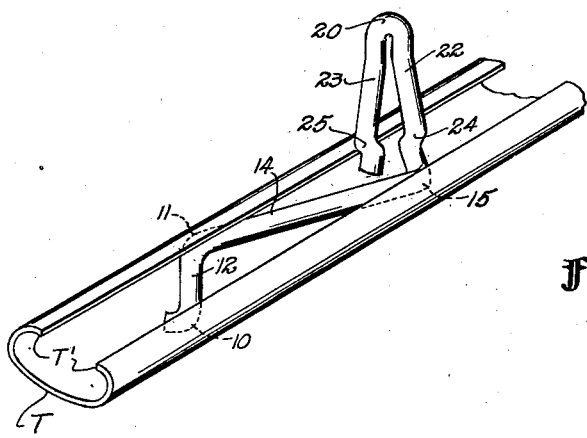
Fig. 1 is a perspective view showing a clip inserted in a section of bead trim.

Trim for various uses such as beading for interior decoration, for metal furniture, and, as above mentioned, for use in trim of radiators and hoods of automobile bodies, requires to be firmly held in position, and such trim takes various forms, but essentially it usually comprises a channel having a partially opened side or slot at which terminate inturned flanges forming the edges of the strip from which it is formed.

In the drawings, T indicates such a trim strip having inturned flanges $T^1$ when securing these strips to the body, radiator or hood member of an automobile, or to sheet metal or like support such as a wall of a piece of furniture. The receiving or base member is provided with spaced perforations, and spring clips embraced by the inturned flanges of the channel and having aperture engaging portions have been used. In the present case, as above indicated, I have provided such a clip made from a single piece of wire and capable of being inserted into the open inner or under side of the trim at any point along its length, the clip being provided with an aperture engaging portion projecting substantially at right angles to the trim.

The strip engaging portion is shown as comprising a curved or bent end 10, of a single piece of wire extending diagonally across the channel at 12 and engaging the off-set flange at a bent portion 11, and then extending at 14 in a less abrupt angle to bend 15 which engages the same side as the portion 10.

The bend 15 shown as extending inwardly and then upwardly joining with a loop or aperture engaging portion which is formed roughly in the shape of an arrowhead. The intermediate or nose portion of this loop is designated 20. The wire for a distance below the bend 20 is nearly parallel and below this, as is shown in Fig. 1, the leg portions 22 and 23 flare slightly and each has an abrupt off-set portion at 24 and 25, while the end of the leg portion 23 is shown as terminating above the reach 14 and freely movable.

Figure 2:
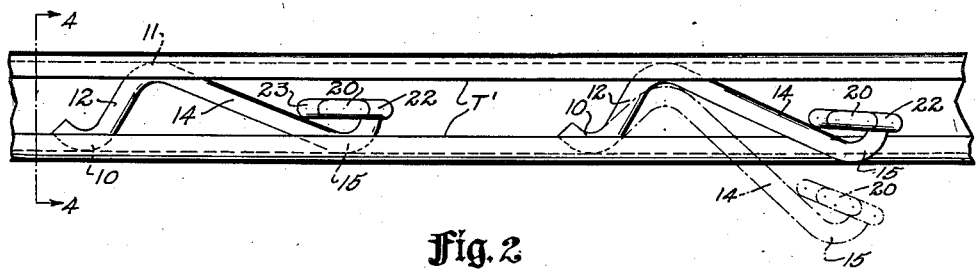
Fig. 2 is a bottom plan view showing such a clip in position and another clip being inserted.

The curvature, relative length, and angle between the legs 12 and 14 is such that to insert the trim engaging portion it is only necessary to first bring the bent end 10 under one of the flanges of the strip with the clip in approximately the position shown in broken lines at the right of Fig. 2, and then bring it to the position shown in solid lines in that figure and thereafter by further pressure on the loop portion swing the bent portion 15 to clear the edge of the flange, and then press it into the channel and release, thus effecting the engaging position shown in Figs. 1 and 2.

By positioning a number of these clips according to predetermined marks or markers, very rapid assembly is accomplished; also, subsequent longitudinal movement, if necessary, is possible. For example, if when the loop is being pressed into the orifice or apertures formed in the receiving member there is a slight misalignment, the taper of one of the legs 22 or 23 will effect such longitudinal movement as will bring about final proper position. The shoulders formed by the off-set portions 24 and 25 then engage beneath the carrying member or sheet and by their abrupt slope and consequent wedge action effectively draw the clip and thus the bead to the plate or other member on which it is carried.

Figure 3:
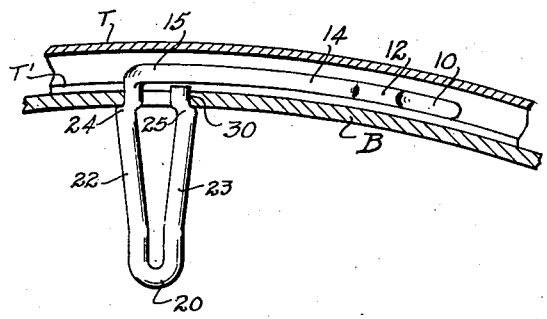
Fig. 3 is a sectional view showing a clip fitted into a curved bead.
Figure 4:
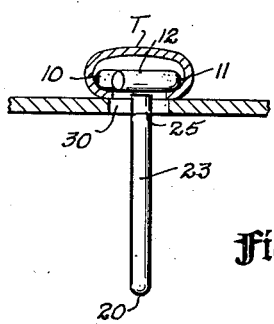
Fig. 4 is a sectional view taken substantially on the line 4—4 of Fig. 2.

As indicated, the channel is frequently curved as shown in Fig. 3 to fit onto the base plate or strip B in which instance the channel engaging portion bends itself to a curve in conformity to the channel, and the head engages the aperture indicated at 30 in the member B as described. The shoulder engagement of the off-set portions 24 and 25 is apparent in this figure.

Figure 6:
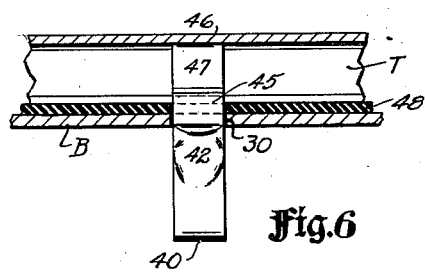
Fig. 6 is a longitudinal section of the bead taken at right angles to Fig. 5 as indicated by the line 6—6 of Fig. 5.
Figure 7:
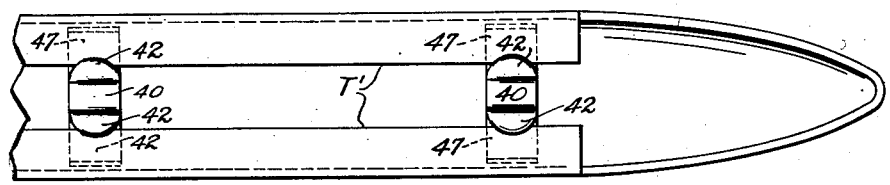
Fig. 7 is a bottom plan of the bead trim showing two clips in position.
Figure 8:
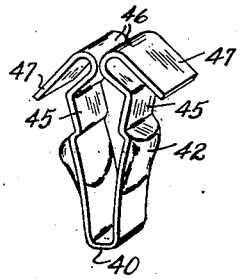
Fig. 8 is a perspective view of such a clip.

In the modified form shown in Figs. 6 to 8, the clip is adapted as above to be inserted in position in a hollow member such as a channel bead trim T and thereafter snapped in the openings of the frame member or support B.

This clip is shown as formed of a flat strip, preferably of spring steel or the like, and comprises a nose portion 40 with leg portions divergent therefrom and having outwardly rounded locking shoulder portions 42. Beyond the shoulder portions 42 the strip extends normally slightly flaring upwardly or outwardly away from the nose portion 40, as at 45, and then each of its free end portions is converged in the form of rounded abutment portions 46 and then extended downwardly in the form of head portions and outwardly as at 47.

These clips are inserted into the opening T' of the trim T head foremost and are of such width that they may be freely passed therethrough and thereafter turned at right angles as shown particularly in Fig. 7. When in this position the portions 45 abut the edges of the opening or slot T' while the abutment portions 46 are tightly in engagement and the head portions 47 extend downwardly and resiliently engage the lower portions of the inside of the hollow trim member T.

Thus, the clips are firmly held in position and while being capable of being moved longitudinally so that they may be registered with and passed through the apertures 30 in the base or support member B while the locking shoulders 42 press outwardly beneath the edges of the apertures 30 causing constant downward tension.

A resilient strip such as indicated at 48 having apertures registering with the apertures 30, is usually used to prevent noise from relative movement.

The upper portions of the head portions 47 above the abutment shoulders 46 engage the top of the clip while the head portions 47 tend to so position the clip in the trim member to allow pressure upon the channel to cause the clip to be forced sufficiently through the members B to assure the shoulders 42 passing through openings in that member.

When the shoulders 46 are in contact, it will be seen that the clip must spring in each of its reaches or leg portions between the nose portion and the shoulders to permit the tapered humps or locking shoulders 42 to pass through the opening in the supporting member B. Thus considerable outward pressure or force is exerted in each of these leg portions, comparable to a spring bridgelike member, thereby forcing the sloping upper sides of the shoulders 42 outwardly into engagement with the inner or lower face of the supporting member, resulting in a constant pressure, which prevents loosening.

Further, because of the meeting of the abutment portions 46, the stiffness just described renders removal of the strip difficult or impossible without distortion or breaking of some of the parts, except by applying some instrument to the inside of the clips to compress the shoulders 42 toward each other.

Figure 5:
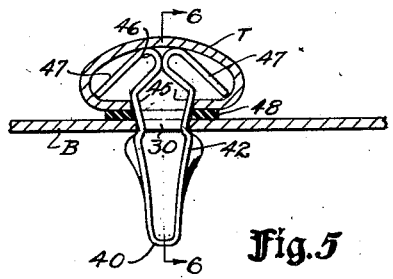
Fig. 5 is a section showing another form of my bead trim clip.
Figure 9:
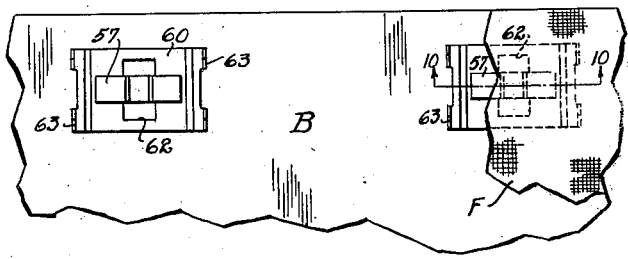
Fig. 9 shows the use of a clip in securing a panel or mat and a steel frame member.
Figure 11:
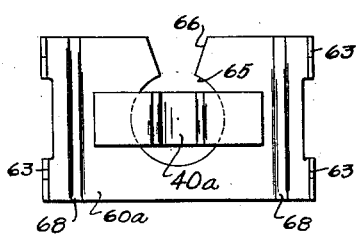
Fig. 11 is an enlarged plan view of the clip with panel attaching means.
Figure 10:
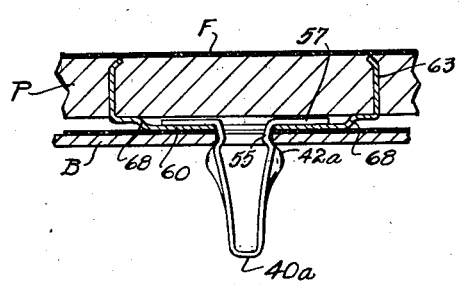
Fig. 10 is an enlarged sectional view taken on the line 10—10 of Fig. 9.

The modified form shows an adaptation of a device similar to that shown in Fig. 5 and also similar to a form of clip shown in my co-pending application, Serial No. 627,243, filed August 2, 1932, and is an arrangement the use of which is illustrated in Figs. 9, 10, 11, and in which the clip is formed of a strip having a nose portion 40$^a$, shoulders 42$^a$, as shown in Fig. 10, from which the strip extends normally slightly flared as at 55, terminating in flat portions 57.

These portions 57, as described in the co-pending application, normally spring downwardly slightly, but in the position shown are approximately flat, exerting an upper tension on the shoulders 42$^a$, causing them to engage the base member designated B and urged downwardly against a plate 60. This plate may have a central opening formed either of two ways, for example, as in Fig. 9, in the nature of a rectangular opening 62 while suitable prongs 63 engage the body portion of a panel P on which is carried suitable fabric and finish F.

The rectangular opening permits the members 57 to be thrust through it and by a quarter turn of the clip the members 55 engage the side edges of the opening, preventing turning movement. This also allows for some movement for registering a clip with the opening in the base or frame plate B.

To secure greater freedom of movement between the clip member and the plate, the plate as shown at 60$^a$ (Fig. 11) may have a round opening 65 which has a flared shoulder portion or slot 66, too narrow at its inner portion to permit passage of the clip portions 55 therethrough except when the clip is compressed to bring them together. When in position shown, however, the clip has considerable movement within the opening 65, and the plate 60$^a$ is provided with suitable prongs as at 63 for engagement with the fibre body of the trim panel or the like.

Either form of plate 60 or 60$^a$ is shown as being offset at 68 to form the space between the panel body P and the plate 60, leaving room for the projecting ends 57 of the clip.

Having thus described my invention, what I claim is:

1. The combination with a hollow member having a slot on one side and a support having an aperture, of a clip member for securing the member to the support, said clip comprising a single strip of spring metal having a portion intermediate its ends in the form of a nose, and leg portions extending therefrom and being receivable nose foremost through the aperture in the support, said leg portions having locking shoulders engageable with the inner face of the support when the leg portions are received through the aperture, said leg portions having head portions adapted to engage at their free ends the inside of the hollow member, and said clip having portions between the head portions and locking shoulders which engage flatwise the edges of the slot in the hollow member, said free ends engaging the hollow member along lines parallel to said edges of the slot and in spaced relation to the flatwise engagement of the intermediate portions to prevent inadvertent turning of the clip about an axis normal to the head portions.

2. The combination with a hollow member having an opening in one face and a support having an aperture therein, of a clip for securing the member to the apertured support and comprising a flat strip of spring metal having a portion intermediate its ends in the form of a nose portion and integral leg portions extending therefrom and defining a substantially V-shaped loop, the free ends of said leg portions being convergent and in the form of abutment portions which are in stressed abutting relation with respect to each other after the clip is installed in the hollow member, and said leg portions having flared locking shoulders positioned between the abutment portions and the nose portion, said locking shoulders facing away from the nose portion and being adapted for engagement with the inner face of the supporting member when the leg portions are passed through an aperture in said supporting member, said clip having head portions inclined outwardly and downwardly from the abutting portions for engagement with the inner surface of the member to be secured to the supporting member, and said head portions being integral with the leg portions respectively and positioned beyond the abutting portions in a direction away from the nose.

3. The combination with a hollow member having an opening and a support having an aperture therein, of a spring clip for securing the hollow member to the support, said clip comprising a flat strip of spring metal having a portion between the ends in the form of a nose and integral leg portions extending therefrom for reception nose foremost through the aperture in said support, said clip having abuttal portions spaced from the nose, said abuttal portions being operative to constrain the leg portions to movement relatively together by flexure intermediate the ends of the leg portions during insertion of the clip in the aperture, head portions on said leg portions, respectively, and positioned beyond the abuttal portions thereof and being inclined outwardly and downwardly from the abuttal portions, said head portions being constrained by said abuttal portions to movement relatively together by flexure of the head portions, and said inclined head portions being adapted for reception in the hollow member through the opening thereof and for resilient independent engagement with the inner wall surface of the hollow member for securing the hollow member to the support.

4. The combination with a hollow member having an opening and a support having an aperture therein, of a spring clip device for securing the hollow member to the support, said device comprising a strip of spring metal having a portion between its ends in the form of a nose and leg portions extending therefrom and defining a loop adapted for reception through the aperture of the support, the clip having abutment portions near the free ends of the leg portions arranged to abut each other and constrain the leg portions to flexure relatively toward each other between the ends and the abutment portions during insertion of the clip through the associated aperture, and said clip having head portions beyond the abutment portions which head portions are inclined outwardly and downwardly from the abutting portions and adapted for reception in the hollow member and, after installation of the clip, being constrained by said abutment portions to flexure substantially independently of the leg portions, relatively toward each other.

5. The combination with a hollow element and a support having an aperture therein, of a securing clip for fastening the hollow element to the support, said clip comprising a single strip of spring metal having resilient leg portions disposed in spaced relation to each other and in the form of a shank member adapted for reception end foremost in said aperture, said strip having portions in the form of a resilient head member on the free ends of the said strip adapted for reception in the hollow element, and said strip having locking shoulders spaced from and facing the head member and having abuttable portions between the locking shoulders and the head member, which abuttable portions are arranged for engagement during insertion of the clip through the aperture of the support, the free ends of the head member, in installed position of the clip, resiliently engaging inner surfaces of the hollow element laterally of the hollow element and another portion of the head member resiliently engaging the upper inner surface of the hollow element, said free ends being inclined outwardly and downwardly from the region of the last mentioned resilient engagement.

6. The combination with a hollow trim member having an opening therein and a support having an aperture, of a spring clip for securing the hollow trim member to the support, said clip comprising a strip of relatively flat spring metal having portions in the form of spaced legs adapted for reception through the aperture of the support and having portions in the form of a head adapted for reception in the hollow member for resiliently securing the hollow trim member thereto and to the support, said legs having portions convergent toward the head and in the form of locking shoulders, said clip having spaced portions contiguous to the locking shoulders and of an overall length in a direction lengthwise of the legs sufficient to extend into the opening in the hollow trim member and the support, and to engage flatwise at their outer faces the edges of the opening in the hollow trim member and also to engage the support.

7. The combination with a hollow member having an opening in one face and a support having an aperture therein, of a spring clip for securing the hollow member to the support, said clip comprising a strip of spring metal having a portion between its ends in the form of a nose and resilient leg portions extending therefrom for reception nose foremost through the aperture in said support, said strip having its free end portions in the form of separate head portions adapted for engagement with the hollow member for securing the hollow member to the support by resilient engagement of the said head portions at their free ends with the inner wall surface of the hollow member, and said clip portions between the head portions and the nose portion being in abutting relation when the head portions are urged together after installation of the head portion in the hollow member, said abutting relation being operative to constrain the head portions to flexure independent of the flexure of the leg portions when the clip is installed, locking shoulders on the leg portions engageable with the inner surface of the support when the leg portions are passed through the aperture of the support, said head portions being inclined outwardly and downwardly from the abutting portions.

JOHN H. VAN UUM.